(12) United States Patent
Nobis et al.

(10) Patent No.: US 6,397,164 B1
(45) Date of Patent: May 28, 2002

(54) DEVICE FOR DETERMINING THE WHEEL AND/OR AXLE GEOMETRY OF MOTOR VEHICLES

(75) Inventors: Guenter Nobis, Wendlingen; Volker Uffenkamp, Aalen, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/582,277

(22) PCT Filed: Dec. 21, 1998

(86) PCT No.: PCT/DE98/03744

§ 371 (c)(1),
(2), (4) Date: Sep. 7, 2000

(87) PCT Pub. No.: WO99/34167

PCT Pub. Date: Jul. 8, 1999

(30) Foreign Application Priority Data

Dec. 23, 1997 (DE) .......................................... 197 57 760

(51) Int. Cl.$^7$ .............................................. G01B 11/26
(52) U.S. Cl. ......................... 702/150; 702/94; 702/105; 700/279; 356/139.09; 356/155
(58) Field of Search ........................... 702/150, 94, 95, 702/105; 356/138, 139.03, 139.09, 155; 700/279; 33/203, 288, 203.12

(56) References Cited

U.S. PATENT DOCUMENTS

| | | | | |
|---|---|---|---|---|
| 4,745,469 A | * | 5/1988 | Waldecker et al. | 29/273 |
| 5,675,515 A | | 10/1997 | January | 700/279 |
| 5,724,129 A | * | 3/1998 | Matteucci | 33/203.18 |

FOREIGN PATENT DOCUMENTS

| | | |
|---|---|---|
| DE | 36 18 480 | 5/1995 |
| DE | 44 09 198 | 9/1995 |
| DE | 196 14 564 | 10/1996 |
| DE | 195 28 798 | 2/1997 |
| DE | 197 57 760 | 7/1999 |
| EP | 0 587 328 | 3/1994 |
| EP | 0 803 703 | 10/1997 |

OTHER PUBLICATIONS

Komeg Imetric, "Wir machen das Messen mobil"**.

* cited by examiner

Primary Examiner—Marc S. Hoff
Assistant Examiner—Hien Vo
(74) Attorney, Agent, or Firm—Kenyon & Kenyon

(57) ABSTRACT

A device for determining the wheel and/or axle geometry of motor vehicles in an inspection room using an optical measuring device having at least two image pick-up devices, which, from at least two different perspectives, record images from a marking device (or optical target), inclusive of at least one wheel feature arranged on each wheel, and including an evaluation device. The marking device further includes an automobile body feature and a reference feature arrangement, including at least three reference features for use in obtaining geometrical wheel and axle data. The inspection room is defined between the reference feature arrangement and the driving surface plane. The position of the reference features in the inspection room is known or stored in the evaluation device. The marking device is detected while the motor vehicle is being driven past. The at least one wheel feature is detected to define a wheel plane in at least three different rotational positions of the wheel, and the at least one automobile body feature is detected at the same time to define the vehicle's motion coordinates. The evaluation device defines at least the wheel and/or axle geometry from the relative position of the wheel plane to the vehicle's motion coordinates.

10 Claims, 2 Drawing Sheets

DEVICE FOR DETERMINING THE WHEEL AND/OR AXLE GEOMETRY OF MOTOR VEHICLES

FIELD OF THE INVENTION

The present invention relates to a device for determining the wheel and/or axle geometry of motor vehicles in an inspection room using an optical measuring device which has at least two image pick-up devices which, from at least two different perspectives, records images from a marking device (optical target), inclusive of at least one wheel feature existing or arranged on a wheel, and including an evaluation unit.

BACKGROUND INFORMATION

In German Published Patent Application No. 42 12 426 is discussed a device for determining a vehicle's wheel track and camber, characteristic regions of the wheels are recorded by video cameras. The wheel in question is provided outside of its axle with a marking that is able to be registered optically (that is, an optical target). The marking is recorded during rotation of the wheel by two synchronized video cameras. During rotation of the wheel, the vehicle rests on rollers. From the spatial positions of the markings on the wheels, one determines the relative positions of the corresponding axles. The video cameras are arranged symmetrically to the axle of the corresponding wheel, the vehicle resting on rollers, and the wheels turning in roller prisms. When this system is used, the possibilities for measuring wheel or axle geometries are limited to wheel track and camber or measurements, and substantial outlay is required to adjust the axle geometry.

SUMMARY OF THE INVENTION

An object of an exemplary embodiment of the present invention is directed to providing a device, which, while providing a simplified operation, will enable one to obtain more information with respect to wheel or axle geometry. There is no need for adjustment of the image pick-up device.

In this regard, an exemplary embodiment of the present invention is directed to providing that the marking device continues to include an automobile body feature and a reference feature arrangement, including at least three reference features, the position of the reference features in the inspection room being known in the evaluation device, that the marking device is detected while the motor vehicle is driven past, the spatial coordinates of the at least one wheel feature being detected to determine one wheel plane from at least three different rotational positions of the wheel, and the spatial coordinates of at least one automobile body feature being detected simultaneously to define the vehicle's motion coordinates, and at least the wheel or axle geometry being able to be determined by the evaluation device from the position of the wheel plane relative to the vehicle's plane of motion.

From the vehicle's motion coordinates, a steering motion during the measurement can also be detected. One can then distinguish whether a correction can be made, for example given a comparably large steering radius during the evaluation, or whether such a correction cannot be made given unsteady steering motions, so that a repeat measurement is then called for.

Using the at least one wheel feature, the at least one automobile body feature, and the reference feature configuration, the image pick-up devices' positioning can be precisely determined with the aid of the evaluation device, and the wheel plane can be calculated relative to the vehicle's motion coordinates, making it possible to define the wheel and axle geometries. In this context, the wheel or axle geometry is determined under real driving conditions, and not from a standing position. This enables one to fundamentally avoid strain in the wheel suspensions, as well as influences resulting from bearing clearance.

For the most part, there is no need to precisely level the measuring station, since a deviation from the horizontal no longer enters into the calculation directly as a measuring error. The extent to which the measuring station is made even or level can be minimized to that which is required by the vehicle. An extremely fast measurement can be taken, with little preparatory outlay for the vehicle. The need is eliminated for adjusting a measuring device at the wheel, as may be required by other systems and/or methods, and operation of the device is relatively simple.

It is believed that the measured value acquisition itself takes place in fractions of a second, with a higher level of accuracy and, at the same time, a larger measuring range than that of other arrangements, being given for all measured quantities. This specification of the geometrical data is not limited to angular units. The data and can also be provided as absolute units of length. Using the same device and the same method, the geometric wheel and axle data of commercial vehicles can be determined at another measuring location, which is set up for the dimensions of commercial vehicles. For this, no other testing technology is needed.

Using the device, one can arithmetically determine the driving axis and, in addition, the following geometrical wheel and axle data: individual track for each wheel, total track for each wheel pair, camber for each wheel, front/back wheel offset, right/left lateral offset, track width difference, and track width, as well as axle offset.

Using the additional automobile body features at defined points in the wheel segment region, one can additionally determine the deflection or load condition of each wheel and/or the inclination of the automobile body in the longitudinal and transverse directions. This makes it possible to quickly ascertain deviations from a predefined uniformity of the load condition and, if necessary, to correct it through appropriate loading/unloading, or to allow for it in vehicle-specific correction calculations.

A relatively simple design, including reference features that are able to be reliably detected, is achieved in that the reference feature configuration has a mount support unit, whose arrangement can be freely designed in the inspection room, and on which the reference features are provided in the form of reference structures or specially applied reference features. This enhances the reliability of the measuring results.

If the reference features are not only arranged in an even, planar configuration, but also spatially offset from one another with respect to the image pick-up device, then the evaluation is simplified, as compared to an even configuration of the reference features, while ensuring substantial reliability of the measuring results.

To reliably detect the marking features, a further benefit may be derived from measures which provide for the reference features and/or the wheel features and/or the automobile body features to be designed as retro-reflecting marks, and the image pick-up device as a camera.

A cost-effective design for the device is achieved by providing only one measuring unit with at least two image pick-up devices, and by initially determining the geometrical wheel and axle data for the one vehicle side as the vehicle drives past, and then for the other vehicle side, as the vehicle drives past again from the other side.

Compared to a one-sided arrangement of a measuring unit, one expands upon the measuring possibilities in that, using only one measuring unit from only one position, one simultaneously detects at least three reference features for each vehicle side, the wheel features of the wheels of at least one vehicle axle, and at least one automobile body feature while the vehicle drives past; and one at least sequentially or simultaneously detects the wheel features of the wheels of all vehicle axles, and the assigned automobile body feature (s); or in that, to determine the wheel and axle geometry on both sides of the vehicle, when the vehicle drives past one time, a measuring unit having at least two image pick-up devices is provided on both sides of the measuring location. Besides the track for each wheel, the total track, and the camber for each wheel, such a design of the device enables the evaluation device to also determine the wheel offset, the lateral offset, the track width displacement, and the axle offset.

To enhance measuring sensitivity, it can be provided for a measuring unit to include at least three image pick-up devices.

The measure which provides for using at least one light source to illuminate the reference features, the wheel features, and the automobile body features further enhances the ability to detect the wheel features, the automobile body features, and the reference features. Having at least one light source in the vicinity of the lens of the image pick-up device(s) facilitates the detection of retro-reflecting measuring and reference features. If provision is made in this context for the light sources to radiate light outside the range of the visible spectrum, e.g., for the light sources to be infrared light-emitting diodes, then any degradation in the light conditions is avoided for the operator of the device at the measuring site.

The wheel features, the wheels of a plurality of vehicles, or also a plurality of measuring stations can be automatically distinguished in that at least one wheel feature, and/or at least one automobile body feature, and/or at least one reference feature bears a coding that is detectable by the image pick-up device.

By applying a plurality of wheel marks and by coding at least one of these wheel marks per wheel, it is especially possible as well, to determine the magnitude of a form error of one wheel rim and to clearly assign it to the corresponding wheel mark and, if indicated, to allow for it during subsequent measurements or evaluations, i.e., to correct it.

DETAILED DESCRIPTION

Figure 1:
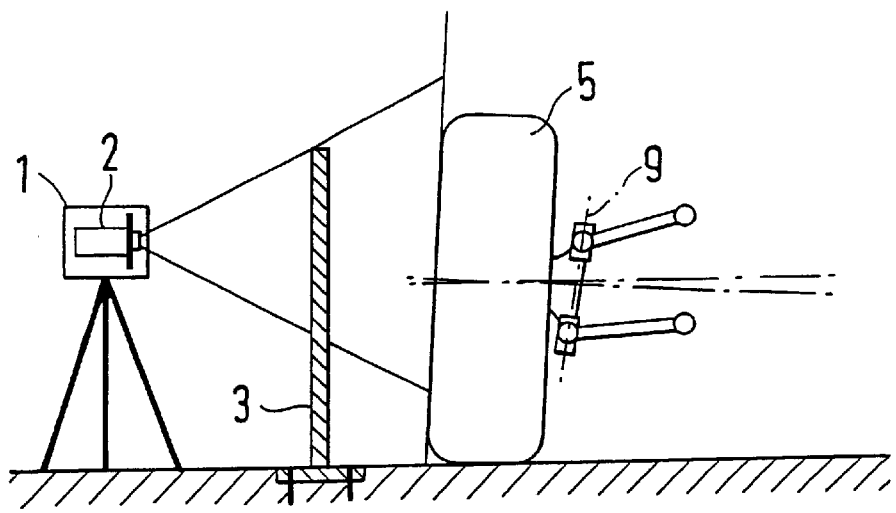
FIG. 1 shows an arrangement of the device for determining the wheel and axle geometry, from a view in the longitudinal vehicle direction.
Figure 2:
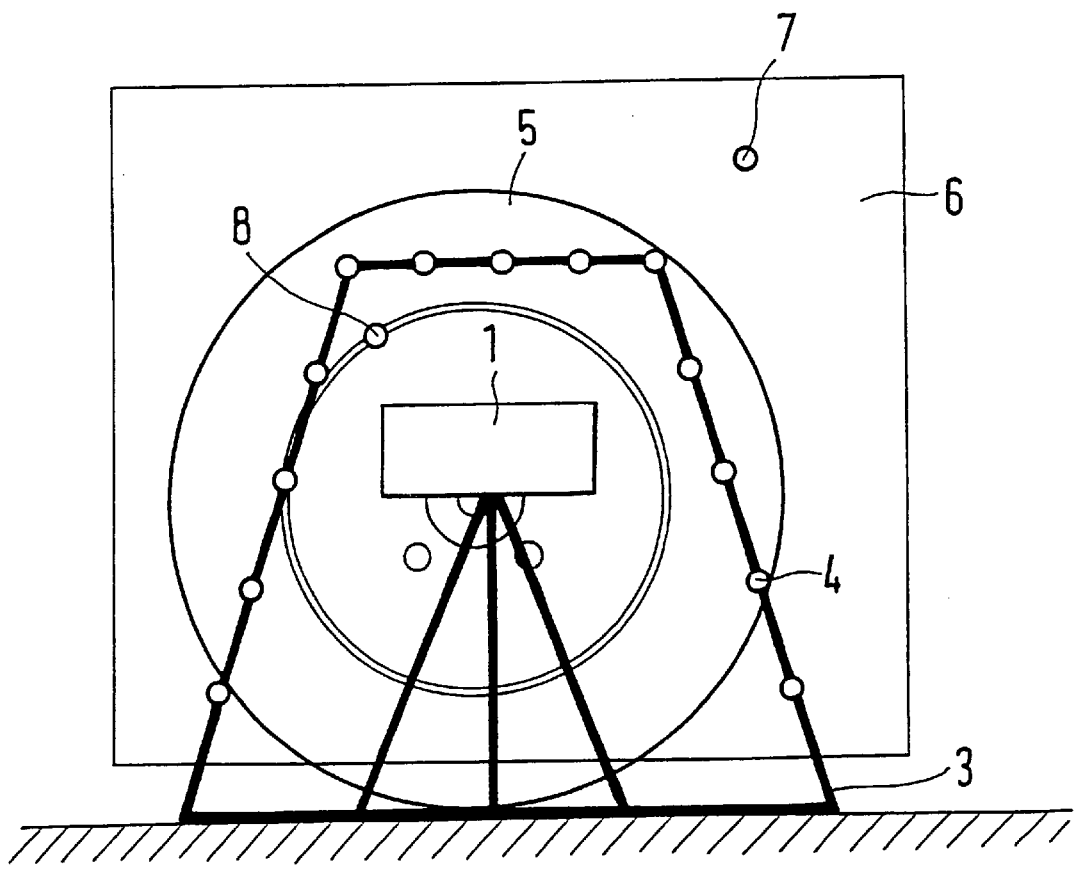
FIG. 2 shows a side view of an arrangement corresponding to FIG. 1.
Figure 3:
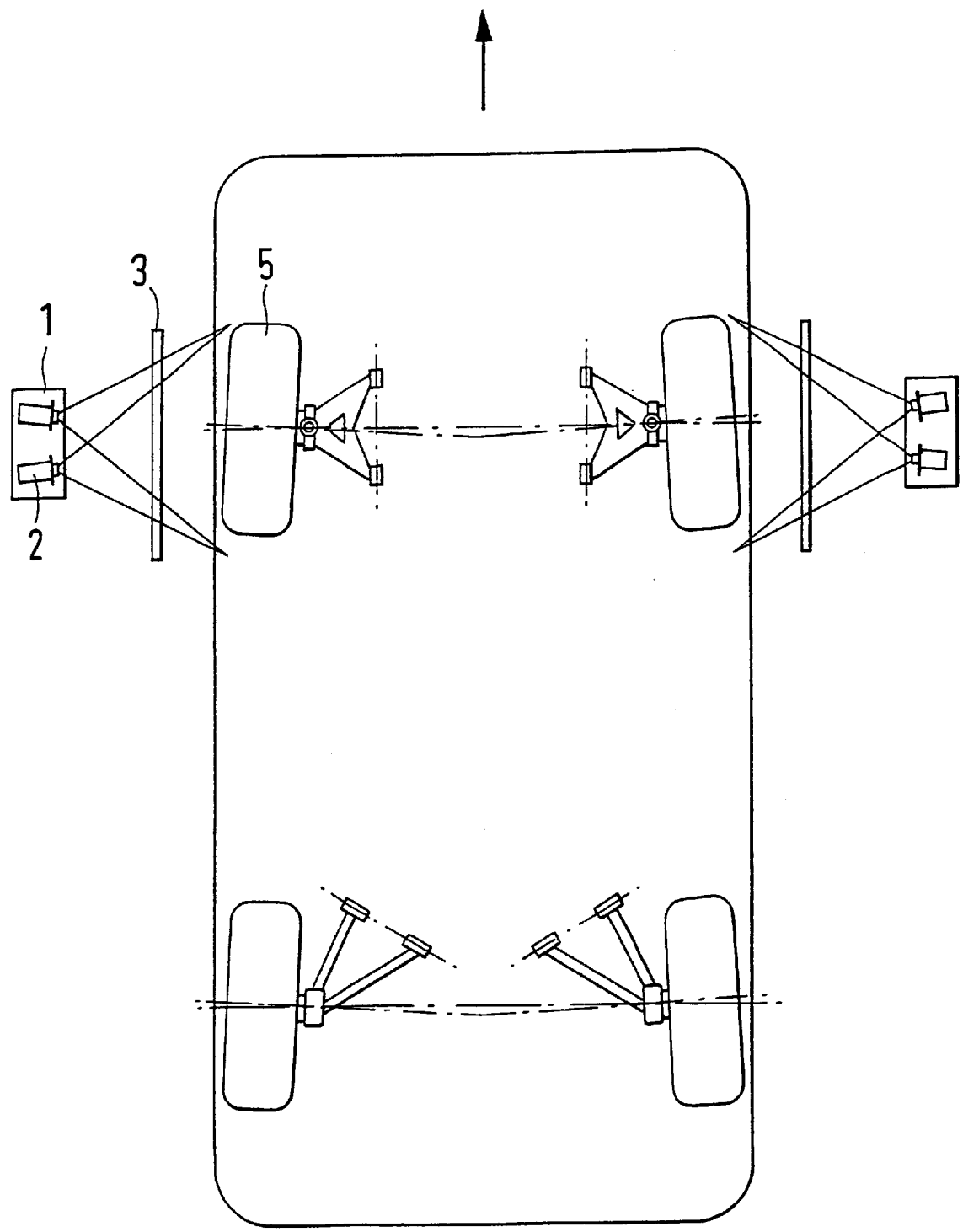
FIG. 3 shows a plan view of an arrangement in accordance with FIGS. 1 and 2.

FIGS. 1 and 3 depict a device for determining the wheel and axle geometry of a vehicle during travel, including measuring units 1 arranged to the side of wheels 5, each on a tripod, including reference feature arrangements 3 disposed between these measuring units and wheels 5. As it is apparent in connection with FIG. 3, each of measuring units 1 predominantly has two image pick-up devices constituted as cameras 2, which record an image segment 6, in which are simultaneously situated wheel(s) 5, as well as reference feature arrangement 3, at least partially, and automobile body mark 7, as the vehicle drives past. From the lateral representation in accordance with FIG. 2, reference feature arrangement 3 has a trapezoidal frame, having a plurality of reference marks 4, and disposed at the rim flange of wheel 5, is a measuring mark 8 and, in addition, at the automobile body, at least one automobile body mark 7. The reference feature arrangements 3 each include at least three reference marks 4 for each vehicle side. Reference marks 4 and wheel mark 8, as well as the least one automobile body mark 7 are designed to be retro-reflecting. Also shown is a steering-swivel axis 9.

The diameter of the optically, diffusely reflecting reference marks 4, (which in this example are circular) of wheel mark 8, and of automobile body mark 7 is selected as a function of the object-to-image ratio of the camera lens, the size of the receiver element, designed, e.g., as a CCD receiver, of camera 2, and of the object distance. In this context, there is no need to adjust wheel mark 8. The at least one automobile body mark 7 on each automobile body side is used to detect the vehicle's path of motion in the inspection room.

One measuring unit in the form of a measuring head 1 is positioned on the left and right side of the measuring location. Measuring heads 1 contain at least two image pick-up devices constituted as cameras 2, which, from different perspectives and at a sufficient distance, are able to optically detect, in image segment 6, the wheel 5, having the at least one applied reference mark 8 and, at the same time, at least a partial surface of the automobile body having automobile mark 7, as well as the reference feature arrangement 3, or a part having reference marks 4 arranged in a planar or spatial configuration therein. In this context, to achieve a high measuring accuracy, it is advantageous to illuminate the marks from the particular camera 2. This can be done relatively simply using light-emitting diodes LEDS arranged around the lens, which advantageously radiate light in the infrared range, i.e., in the near infrared range so that any degradation of the light conditions is avoided for the operator of the device at the measuring location.

In the exemplary embodiment, reference feature arrangement 3 is made of two trapezoidal frames, with reference marks 4 secured thereto. The frame is anchored to the floor, to the right and left of the measuring site, so as to enable a vehicle to easily drive in-between. The inspection room is defined between the reference feature arrangement and the driving surface situated therebetween. The spatial coordinates of reference marks 4 are known from previous scanning and ranging measurements and stored in an evaluation device (not shown).

Once the measuring operation starts, the vehicle, having undergone preparation for the measurement, drives through the measuring station (between the installed reference feature arrangements 3 and the measuring heads 1). In the process, using the light exposure time of the two measuring heads 1 adapted to the drive-through velocity, time-synchronous images are continuously recorded at different vehicle positions and wheel settings (with respect to an angle of rotation). From the positions of the images of the at least one wheel mark 8 recorded in the various rotational positions of wheel 5, a wheel's plane of rotation can be defined.

On the basis of the time-sequential coordinates of automobile body marks 7 attached to the automobile body, the vehicle's path of motion can be defined relative to reference feature arrangement 3. By considering the time-sequential coordinates of wheel marks 8 attached to wheels 5, the vehicle coordinate system (e.g., vehicle longitudinal axis/plane, i.e., driving axis) and subsequent geometrical wheel and axle data can be arithmetically determined: track for each wheel, total track, camber for each wheel, front/rear wheel offset, right/left lateral offset, track width difference and axle offset. These geometrical data exist as angular quantities, but can also be specified in units of length. The track width can also be included in these specifications.

By applying the automobile body marks 7, or also other automobile body marks at defined points in the wheel segment region, one can additionally determine the deflection or load condition of each wheel and/or the inclination of the automobile body in the longitudinal and transverse directions. This makes it possible to quickly ascertain deviations from a predefined uniformity of the load condition and, if necessary, to correct it through appropriate loading, or to allow for it in vehicle-specific correction calculations.

The sequential images recorded time-synchronously, from various perspectives and at a sufficient distance, by the two measuring units 1, while the vehicle drives through the measuring station, are analyzed using known image processing methods, reference features 4, automobile body features 7, as well as wheel features 8 being identified. Using known triangulation methods, it is possible to define the three-dimensional coordinates of each reference feature 4, of each automobile body feature 7, and of each wheel feature 8 in relation to reference feature arrangement 3 and to the measuring time. On the basis of these coordinates of the sequential images, it is now possible using known methods of geometry, on the one hand, to determine the driving axis plane of the motor vehicle in the inspection room and, thus, to detect other unacceptable variations in driving direction (steering lock) while the vehicle drives past, to display them, and/or to allow for them in a correction operation, in the analysis of the geometrical wheel or axle data. On the other hand, it is possible to define the position of the wheel's plane of rotation relative to the particular reference feature arrangement 3 and to the ascertained driving plane. From the relative position of the particular wheel features 8 of each wheel 5, of automobile body feature(s) 7, or of the automobile body, as well as from the positions of reference features 4 known to the evaluation device, or the determined positions of the wheel planes forth respect to the vehicle's coordinate system, the geometrical data required for measuring the chassis by scanning and ranging are now defined. When a plurality of wheel features 8 are applied per wheel 5, it is possible, from the deviation of the wheels' planes of rotation with respect to one another, to determine any existing wheel rim wobble.

Given a relatively simple design of the device and simple operation, one can, thus, determine the geometrical wheel and axle data, as well as other quantities (variables) during vehicle travel. This enables one to fundamentally avoid strain in the wheel suspensions, as well as influences resulting from bearing clearance.

What is claimed is:

1. A system for determining at least one of a wheel geometry and an axle geometry of a motor vehicle, the system comprising:
   an optical measuring device including at least two image pick-up devices for recording images from at least two different perspectives from a marking device including at least one wheel feature arranged on a corresponding wheel of the vehicle, and
   an evaluation device;
   wherein:
   the marking device further includes an automobile body feature and a reference feature arrangement, the reference feature arrangement including at least three reference features, spatial positions of the at least three reference features being known in the evaluation device;
   each of the at least two image pick-up devices includes a detecting arrangement for detecting the marking device while the motor vehicle drives past, and for detecting the at least one wheel feature to define a wheel plane in at least three different rotational positions of the corresponding wheel, and for detecting the automobile body feature to define motion coordinates of the vehicle; and
   the evaluation device is installed to define the at least the one of the wheel geometry and the axle geometry from a position of the wheel plane relative to the motion coordinates.

2. The system of claim 1, wherein the reference feature arrangement includes a spatially designable mount support arrangement, at least one of the at least three reference features being one of at least a reference structure and an applied reference feature.

3. The system of claim 1, wherein the at least three reference features are spatially offset from one another with respect to an image recording position.

4. The system of claim 1, wherein:
   at least one of the at least three reference features, the at least one wheel feature and the automobile body feature include a retro-reflecting mark; and
   at least one of the at least two image pick-up devices is a camera.

5. The system of claim 1, wherein the optical measuring device is one of:
   arranged at only one position to jointly detect all wheels of the vehicle; and
   arranged so that the at least one of the wheel geometry and the axle geometry is determinable for one side of the vehicle as the one side of the vehicle is driven past, and is determinable for another side of the vehicle as the another side of the vehicle is driven past.

6. The system of claim 1, wherein the at least two image pick-up devices are provided on both sides of a measuring station to determine the at least one of the wheel geometry and the axle geometry on both sides of the vehicle.

7. The system of claim 1, wherein the optical measuring device includes at least three image pick-up devices.

8. The system of claim 1, further comprising:
   one of a light source and a plurality of light sources for illuminating the at least three reference features, the at least one wheel feature, and the automobile body feature;
   wherein the one of the light source and the plurality of light sources are arranged around a lens of at least one of the at least two image pick-up devices for use with a retro-reflecting mark.

9. The system of claim 8, wherein the one of the light source and the plurality of light sources radiate light in a range that is invisible to the human eye.

10. The system of claim 1, wherein at least one of the at least three reference features, the at least one wheel feature, and the automobile body feature bears coding information detectable by the at least two image pick-up devices.

* * * * *